(12) United States Patent
Salomon-Bahls et al.

(10) Patent No.: US 6,170,887 B1
(45) Date of Patent: Jan. 9, 2001

(54) PLUG CONNECTOR FOR RAPID AND RELEASEABLE CONNECTION OF PRESSURIZED LINES

(75) Inventors: Bernd Salomon-Bahls, Halver; Harald Hagen, Wipperfurth; Volker Kaminski, Halver, all of (DE)

(73) Assignee: Armaturenfabrik Hermann Voss GmbH + Co., Wipperfurth (DE)

( * ) Notice: Under 35 U.S.C. 154(b), the term of this patent shall be extended for 0 days.

(21) Appl. No.: 09/360,704

(22) Filed: Jul. 26, 1999

(51) Int. Cl.$^7$ ...................................................... F16L 21/06
(52) U.S. Cl. ........................... 285/322; 285/382; 285/249; 285/248
(58) Field of Search ..................... 285/322, 243, 285/248, 239, 222.1, 222.2, 222.3, 222.4, 382.4, 382

(56) References Cited

U.S. PATENT DOCUMENTS

| | | | |
|---|---|---|---|
| 3,191,971 | * 6/1965 | Somers | 285/248 |
| 4,770,446 | * 9/1988 | Keller | 285/249 |
| 4,776,616 | * 10/1988 | Umehara et al. | 285/382 |
| 5,474,336 | * 12/1995 | Hoff et al. | 285/322 |
| 5,797,633 | * 8/1998 | Katzer et al. | 285/322 |

FOREIGN PATENT DOCUMENTS

| | | |
|---|---|---|
| 4002057 | 2/1991 | (DE) . |
| 247 214 | 12/1987 | (EP) . |
| 373 272 | 6/1990 | (EP) . |
| 2 051 280 | 1/1981 | (GB) . |
| 2 172073 | 9/1986 | (GB) . |

* cited by examiner

*Primary Examiner*—B. Dayoan
*Assistant Examiner*—Aaron Dunwoody
(74) *Attorney, Agent, or Firm*—Kilpatrick Stockton LLP

(57) ABSTRACT

A socketless fitting for releasable connection of a pressurized line. The fitting has a housing body with a receiving opening to insert one end of the line, and an inner sleeve attached in the housing body in an arrangement that extends coaxially within the receiving opening for engagement into the inserted line end. The inner sleeve is fastened in the housing body media-tight around the periphery via connectors and preferably engages in the line media-tight around the periphery. Media-tight outward sealing is accomplished by sealing engagement of the essentially rigidly secured inner sleeve in the line, because the inner sleeve itself is also tightly joined to the housing body.

13 Claims, 4 Drawing Sheets

US 6,170,887 B1

PLUG CONNECTOR FOR RAPID AND RELEASEABLE CONNECTION OF PRESSURIZED LINES

BACKGROUND OF THE INVENTION

The present invention concerns a socketless fitting for releasable connection of a pressurized line, consisting of a housing body with a receiving opening to insert one end of the line, and with an inner sleeve attached in the housing body in an arrangement that extends coaxially within the receiving opening for engagement into the inserted line end, in which a clamping element is mounted to move axially in the receiving opening, so that it cooperates with an inner conical surface of the housing body to hold the line and, in so doing, acts radially inward with at least one mounting edge in shape-mated or frictional and shape-mated fashion against the outer periphery of the line.

This type of socketless fitting for pipelines and hose lines with a smooth outer peripheral surface is known from EP 0 247 214 B1. To seal the line connection, it is proposed that the sleeve-like, chuck-like clamping element be sealed on its end facing the insertion opening radially outward against the wall of the housing-receiving opening, as well as radially inward against the line by means of a sealing ring. These sealing rings are then connected to the clamping element in bonded fashion.

The inner sleeve secured in the housing body via a snap connection engages in it with peripheral play for radial support of the line, since its outside diameter should be slightly smaller than the inside diameter of the line. This socketless fitting has essentially proven itself, but the seals connected to the clamping element in bonded fashion require costly manufacture.

A similar line coupling is known from EP 0 373 272 B1 (especially FIG. 9), which, however, is also quite costly to manufacture, since it consists of numerous individual parts. Two sealing rings are provided for sealing, which act on the outer periphery of the inserted line. In other variants, the inner sleeve engages in the line with a number of annular edges. This guarantees mechanical securing of the line; a clamping element, acting in the generic sense on the outer periphery of the line, is not provided here.

In addition, a similar connector had already been proposed, in which the inner sleeve engages in sealing fashion in the line, with a torus. However, it is prescribed therein that the clamping element, which can be moved to loosen or release the line and the inner sleeve with torus are adapted to each other and cooperate, so that during displacement of the clamping element, the torus is caused to engage in the line in sealing fashion or to be released or loosened from the interior of the line. This expedient, however, requires mobility and, for this purpose, at least partial axial slotting of the inner sleeve, so that the torus alone is not sufficient for sealing. Instead, a seal must additionally be present between the clamping element and the housing body, which must permit axial relative movements. A version that is demanding, in terms of design and manufacture, is therefore also involved.

BRIEF SUMMARY OF THE INVENTION

The underlying task of the present invention is to devise a socketless fitting of the generic type described at the outset, which is characterized by simple and cost-effective design and manufacture.

This is achieved according to the invention in that the inner sleeve is fastened in the housing body media-tight around the periphery via connectors and preferably engages in the line media-tight around the periphery with means of sealing. Thus, according to the invention, media-tight sealing outward is guaranteed merely by the sealing engagement of the essentially rigidly secured inner sleeve in the line, because the inner sleeve itself is also tightly joined to the housing body. Special connectors are prescribed for this purpose, which can be made very simply and cost-effectively in different shapes. Some advantageous practical examples of this are described below.

The inner sleeve preferably has at least one sealing torus on its outer periphery as means of sealing. In this region and in the region axially between the sealing torus and the sealing connection of the inner sleeve with the housing body, the inner sleeve is essentially rigid and completely closed, i.e., designed without axial or radial wall openings, so that a sealing line connection is guaranteed without additional seals acting, for example, on the outer periphery of the line.

The sealing torus according to the invention is adapted with respect to its outside diameter to the inside cross section of the line, so that the line can be mounted on the inner sleeve or withdrawn from it again by frictional closure, in which internal sealing is guaranteed in the mounted state by frictional mounting of the line on the sealing torus. The line can therefore advantageously be inserted quickly and simply and, at any time, released again by simple pulling, after the clamping element has also been brought into a loosening position that releases the outside periphery of the line.

Other advantageous embodiments of the invention are contained in the subclaims, as well as the following description.

The invention will now be explained in greater detail with reference to several preferred practical examples and specific variants depicted in the drawings. In the drawings:

DETAILED DESCRIPTION OF THE PREFERRED EMBODIMENTS

Figure 1:
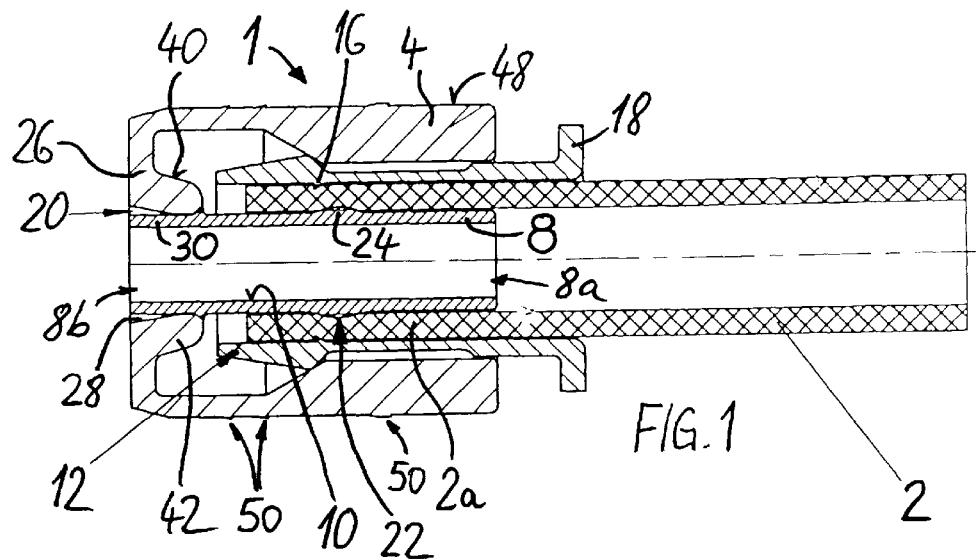
FIG. 1 shows an axial section of a first variant of a socketless fitting according to the invention in the inserted and locked state of a line.

The same parts in the different figures of the drawing are always provided with the same reference numbers and are therefore generally described only once.

Figure 2:
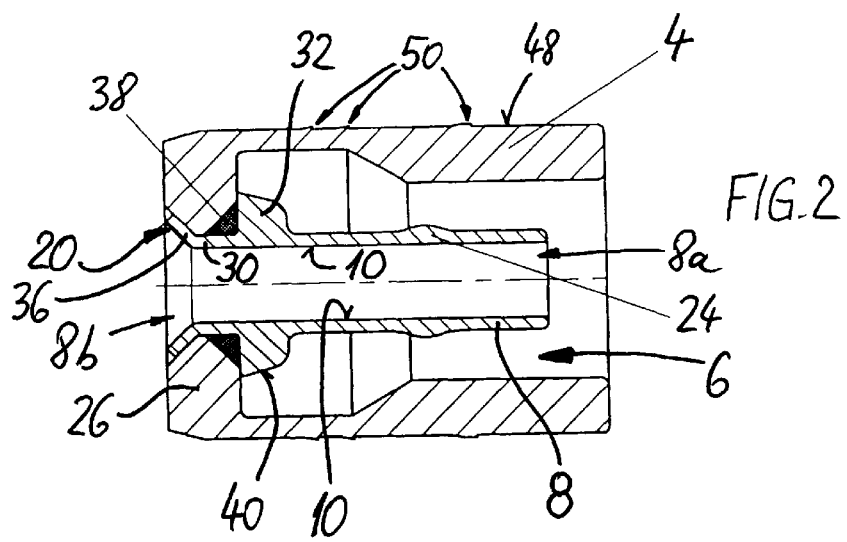
FIG. 2 shows another variant of the socketless fitting, also in axial section, but without showing the clamping element and line.
Figure 3:
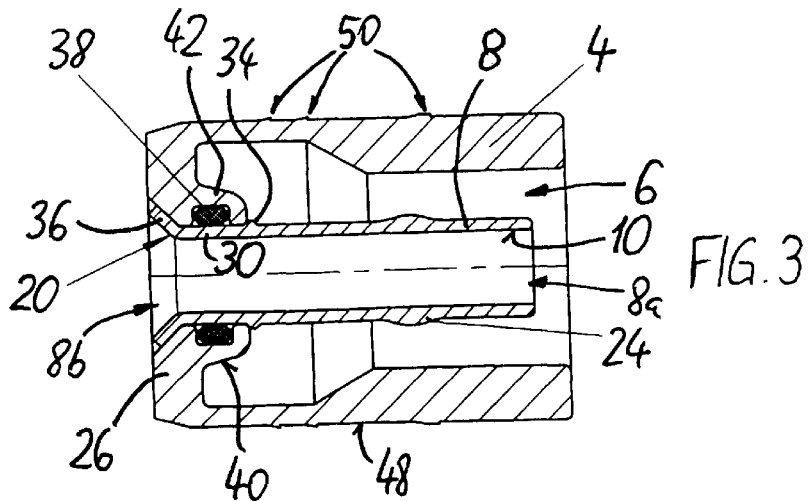
FIG. 3 shows a depiction of another variant as in FIG. 2.
Figure 4:
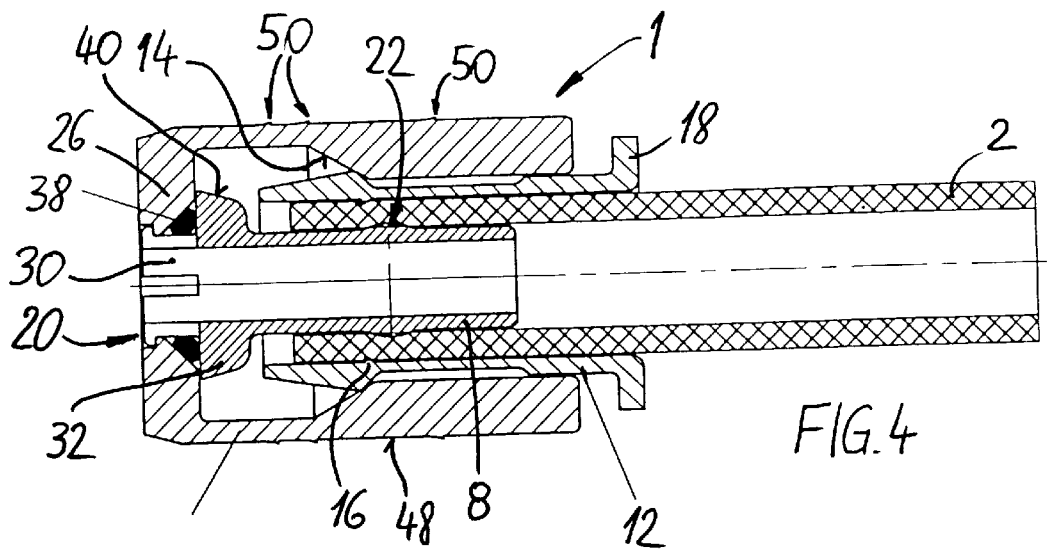
FIG. 4 shows a depiction as in FIG. 1 of another variant.

As initially follows from FIGS. 1 to 4, a socketless fitting 1 according to the invention serves for rapid and releasable connection of (at least) one pressurized line 2 (pipeline or hose line). The socketless fitting 1 consists of a housing body 4 with (at least) one receiving opening 6 (see FIGS. 2 and 3), as well as an inner sleeve 8, which is attached in the housing body 4 on the side opposite the discharge side of receiving opening 6, so that it extends coaxially through the receiving opening 6, in order to engage in the inserted line 2 or in its end 2a for radial support (FIGS. 1 and 4).

The inner sleeve 8 engaging in line 2 forms a transition channel 10 for a pressure medium conveyed through line 2, especially compressed air in pneumatic systems. Consequently, the inner sleeve 8 has openings 8a and 8b on both ends, in which the one opening 8a lies in the line 2 and the other opening 8b lies in the fastening region of inner sleeve 8 in housing body 4.

A sleeve-like clamping element 12 that encloses the inserted line 6 [sic; 2] in the fashion of a clamping jaw or clamping chuck is mounted in receiving opening 6 to move axially to mechanically secure the inserted line 2, so that it cooperates with an inner conical surface 14 of housing body 4 to secure line 2 and, in so doing, acts radially inward with at least one mounting edge 16 in shape-matching fashion, or at least in frictional and shape-matching fashion against the outer periphery of line 2. For this purpose, the clamping element 12 is made radially elastic by at least one axial slit. The clamping element 12 can consist of plastic or metal. When the clamping element 12 protrudes outward from the receiving opening 6 with an activation section 18, it can be pushed away from the inner conical surface 14 for loosening of line 6 manually, so that the mounting edge 16 releases line 2 by radial widening.

The inner sleeve 8 according to the invention is attached rigidly and media-tight around the periphery in housing body 4 via special connectors 20. The inner sleeve 8 according to the invention also engages with sealing devices 22 media-tight around its periphery in line 2. (At least) one rigid, shape-stable sealing torus 24 is preferably arranged as sealing device 22 on the outer periphery of inner sleeve 8 (see especially FIGS. 2 and 3). This sealing torus 24 is adapted to the inside cross section of line 2 with respect to its largest outside diameter, so that the line 2 can be mounted frictionally onto inner sleeve 8 with slight elastic expansion or withdrawn from it again. In the mounted state, internal sealing is guaranteed by frictional mounting of line 2 on the sealing torus 24.

As regards the connection devices 20 according to the invention, these consist in all preferred variants of an annular collar 26 of housing body 4 extending radially inward and a mounting section 30 of inner sleeve 8 tightly attached in an opening 28 of annular collar 26. There are different possibilities that will be explained in greater detail below for the rigid and tight attachment of mounting section 30 within opening 28 (FIG. 1).

According to FIG. 1, the mounting section 30 of inner sleeve 8 is fastened in bonded fashion and thus peripherally tight in opening 28 of housing-annular collar 26. Specifically, this can involve tight gluing or welding.

In the variants according to FIGS. 2 to 4, the mounting section 30 of inner sleeve 8 is secured in shape-matched fashion in opening 28 of annular collar 26. The inner sleeve 8 has contact devices on the side of the annular collar 26 facing the line receiving opening 6 lying axially on the annular collar, especially in the form of a radial annular connector 32 (FIGS. 2, 4) or torus 34 (FIG. 3). Attachment devices are provided on the opposite end of mounting section 30, for example, according to FIGS. 2 and 3, in the form of a radial, preferably conical, sleeve expansion 36.

According to FIG. 4, the connection devices 20 can advantageously be formed by a shape-matched snap connection. For this purpose, the mounting section 30 of inner sleeve 8 consists of elastic locking arms formed by axial slits that engage behind annular collar 26 in shape-matched fashion.

Finally, it can be prescribed as an alternative that the mounting section 30 of inner sleeve 8 be pressed firmly and tightly into the opening 28 of annular collar 26. The pressed-in surfaces can advantageously have a specified surface structure for this purpose, for example, knurling.

Especially in the variants with shape-matched attachment of inner sleeve 8, at least one elastic peripheral seal 38 is provided, which seals the annular gap between inner sleeve 8 and housing body 4. The peripheral seal 38 expediently sits radially between housing-annular collar 26 and mounting section 30 of inner sleeve 8. For this purpose, the versions according to FIGS. 2 to 4 are referred to. According to FIG. 2, the seal 38 sits in the angular region between the mounting section 30 and the adjacent annular connector 32 of inner sleeve 8 in an annular chamber formed by internal chamfering of annular collar 26. The same also applies to the variant according to FIG. 4. According to FIG. 3, the annular collar 26 has an internal, radial annular groove within its opening, in which the peripheral seal 38 is arranged so that it lies radially on the outer periphery of mounting section 30.

In another advantageous embodiment of the invention, a counterconical surface 40 is formed and arranged within housing body 4, so that the clamping element 12 can be spread radially to release line 2 by displacement against counterconical surface 40. In the variants according to FIGS. 2, 4 and 5, the counterconical surface 40 is advantageously formed on the annular connector 32 designed in one piece with inner sleeve 8, which simultaneously also serves as a stop for the shape-mated attachment In the alternatives according to FIGS. 1 and 3, the counterconical surface 40 is formed on an axial annular projection 42 of housing body 4, designed in one piece with housing-annular collar 26.

As also follows from FIGS. 1 and 4, the sealing torus 24 of inner sleeve 8, viewed in the axial insertion direction, is arranged roughly in a region in which the mounting edge 16 of clamping element 12 also lies in its locking position that secures line 2. However, the mounting edge 16 preferably lies axially somewhat deeper inside the receiving opening 6 than the sealing torus 24, so that these two functional devices (16 and 24) advantageously mutually support each other both with respect to the sealing effect and the holding effect. This means that the mounting edge 16 forces line 2 against inner sleeve 8 radially, just behind sealing torus 24, which, on the one hand, improves sealing, but also improves mechanical clamping.

Figure 6:
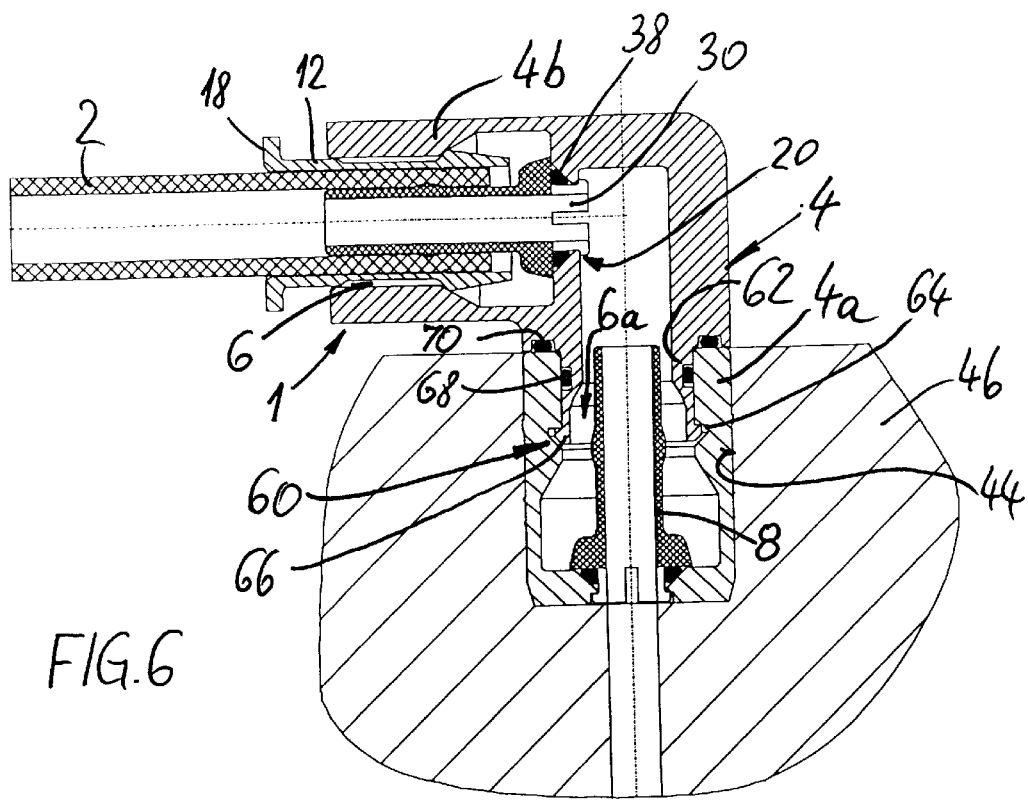
FIG. 6 to FIG. 8 show additional advantageous embodiments of the socketless fitting.
Figure 7:
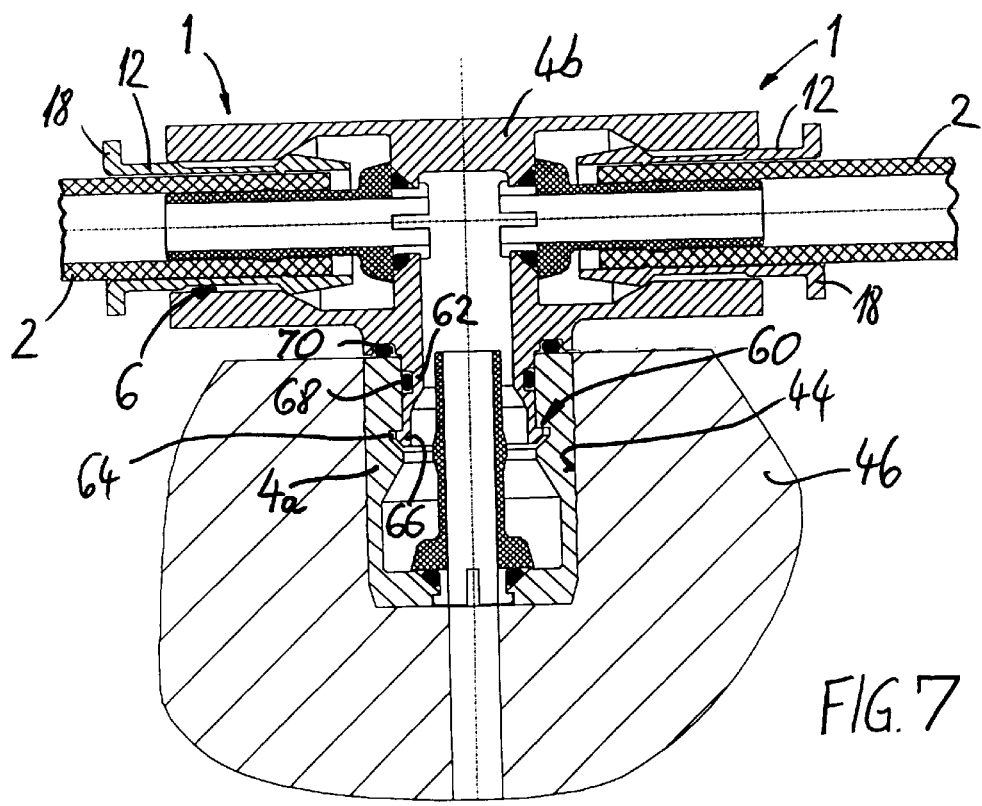
Figure 8:
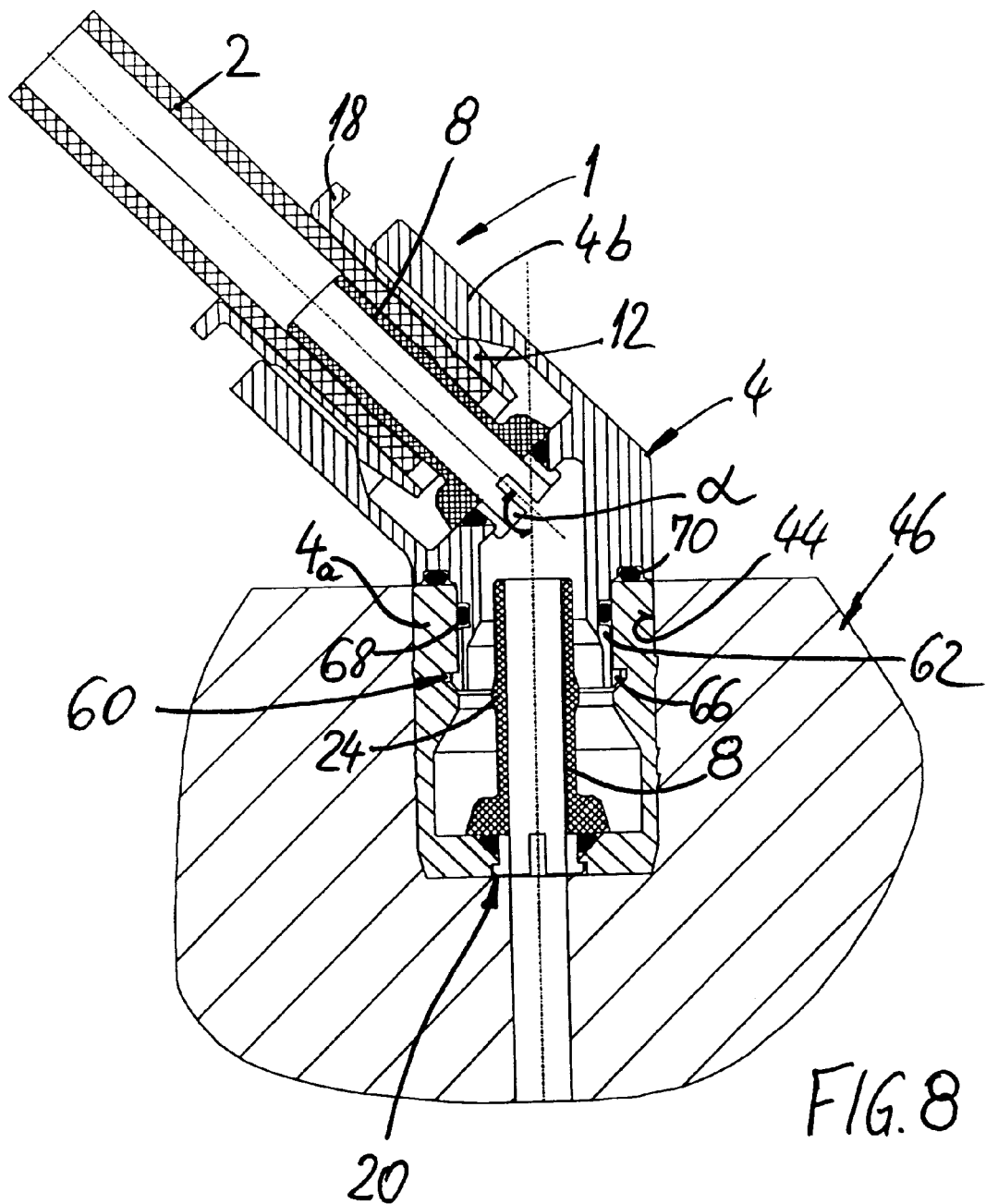

In the variants according to FIGS. 1 to 4, the housing body 4 is designed as a press-in cartridge that can be inserted tightly on the periphery in an opening 44 of (in principle, any) aggregate part 46 (cf. FIGS. 6 to 8 for this purpose). The housing body 4 has clamping and sealing devices 50 especially on its cylindrical outer peripheral surface 48. These are, in particular, annular indentation elements that can guarantee both mechanical clamping and sealing. Optionally, at least one elastic seal can additionally be provided (not shown).

Figure 5:
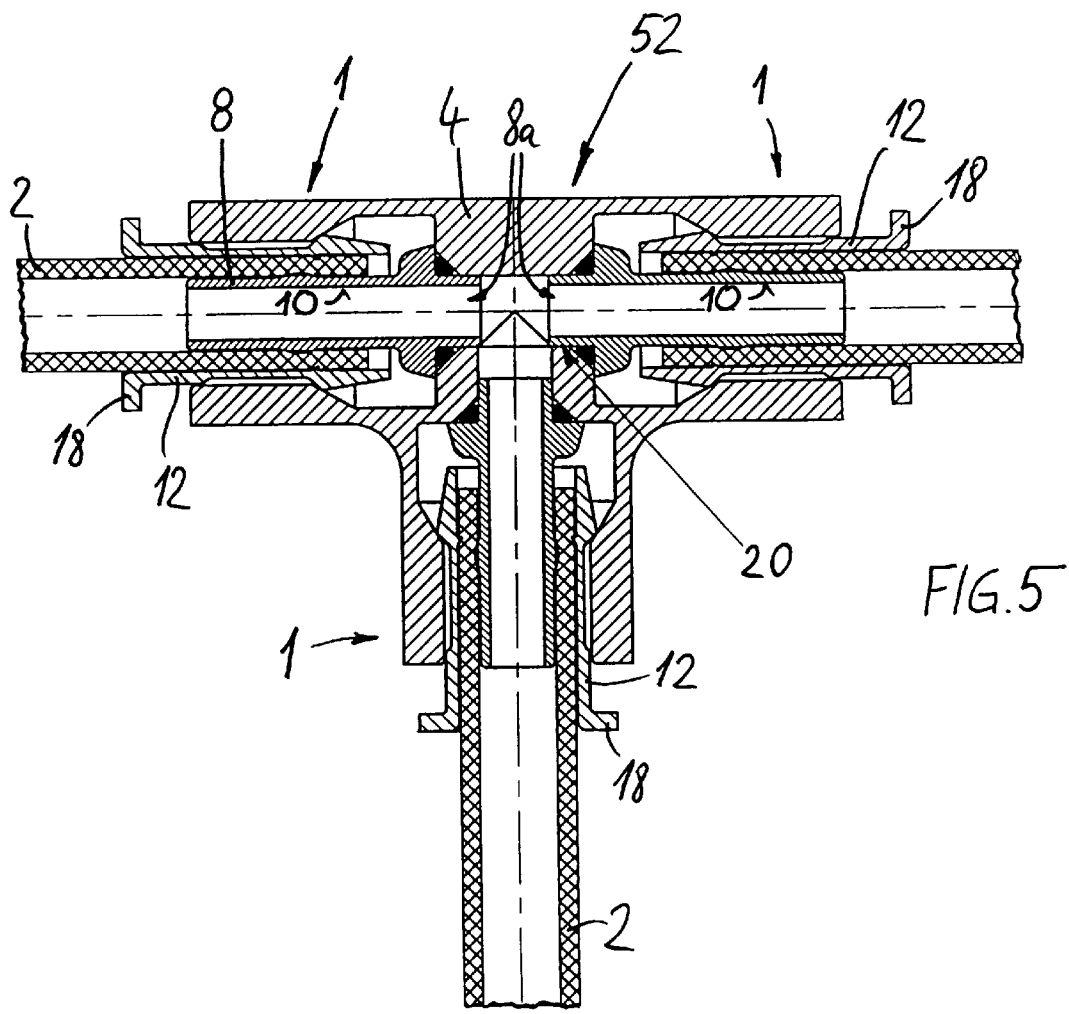
FIG. 5 shows a section of a socketless fitting designed as a transition connector, here especially as a T-connector.

As regards the variant in FIG. 5, this is a transitional connector 52, which consists of at least two, but, as shown as a T-connector, consists of three socketless fittings 1 of the type according to the invention. In this case, a unitary housing body 4 with a corresponding number of line receiving openings 6 is provided.

Since the housing body 4 and inner sleeve 8 in all variants according to the invention are two separate, individually produced parts, these parts, in principle, can consist of any materials and material combinations. To achieve the best possible rigid support of line 2, the inner sleeve 8 preferably consists of metal, for example, brass. This also favors formation of the sleeve expansion 36 in the variants according to FIGS. 2 and 3. Moreover, the contour in the region of sealing torus 24 can be formed by shaping (upsetting). In principle, however, a turned part can also be involved. The variant in FIG. 4 with a snap attachment of inner sleeve 8 is expediently made from an appropriate plastic.

The housing body 4 can also consist of plastic or metal. Metal is preferred for the design as a press-fit cartridge according to FIGS. 1 to 4. An appropriate plastic can also be used for the variant according to FIG. 5.

FIGS. 6 to 8 show special variants, in which the housing body 4 consists of two individual parts that can be joined, an insertion part 4a that can be inserted, especially in the manner of a press-fit cartridge, into a hole 44 of any aggregate part 46 and a connection part 4b that can be connected to line 2. The type of connection of line 2 with connection part 4b is, in principle, any arbitrary connection, i.e., actually independent of the variants already described. However, it is preferably one of the versions of the socketless fitting 1 according to the invention. The insertion part 4a according to the invention is designed here so that it can be connected to the connection part 4b or directly to line 2. The insertion part 4a is therefore a connection adapter.

The insertion part 4a and the connection part 4b are preferably connectable via a shape-matched snap connection 60. The insertion part 4a has a receiving opening 6a, which corresponds in its design to the receiving opening 6 of connection part 4b provided for line 2. The connection part 4b has a connection section 62 insertable in sealed fashion into receiving opening 6a of insertion part 4a. An inner annular groove 64 is formed within the receiving opening 6a of insertion part 4a, in which the connection section 62 of connection part 4b engages with the elastic snap element 66. For pressure-tight sealing, a radial seal 68 can be arranged between the receiving opening 6a of insertion part 4a and the inserted connection section 62 of connection part 4b. As an alternative or in addition, an axial seal 70 can be arranged between the insertion part 4a and the connection part 4b. The axial seal 70 advantageously also secures the connection against relative movements under a pre-tension.

Because of the configuration of insertion part 4a, only the clamping element 12 need be inserted for direct connection of line 2, since the insertion part 4a is already equipped with the inner sleeve 8. However, if an indirect line connection is to occur via connection part 4b, the clamping element 12 is removed from insertion part 4a for this purpose. The inner sleeve 8 can remain in insertion part 4a.

Very high application variability is achieved by this embodiment. The connection part 4b can be produced in different variants, especially with respect to the number and angular alignment of the connected lines. According to FIG. 6, a 90° angle piece is involved, according to FIG. 7, a T-piece and according to FIG. 8, an angle piece with a deflection angle α=135°.

The invention is not restricted to the depicted and described practical examples, but also embraces all variants that are equivalent according to the invention. It should also be understood that the foregoing relates only to preferred embodiments of the invention, and that numerous changes and modifications therein may be made without departing from the spirit and scope of the invention as defined in the following claims.

What is claimed is:

1. Plug connector for releasable connection of a pressurized line (2), comprising:
    a housing body (4) with a receiving opening (6) for insertion of one end (2a) of the line (2), and with an inner sleeve (8) attached in housing body (4) in an arrangement extending coaxially within the receiving opening (6) for engagement into the inserted line end (2a), in which a clamping element (12) is mounted to move axially in the receiving opening (6), so that the clamping element cooperates with an inner conical surface (14) of the housing body (4) to secure the line (2) and, in so doing, acts radially inward against the outer periphery of line (2) with at least one mounting edge (16) in shape-matched or frictional and shape-matched fashion;
    the inner sleeve (8) being rigidly attached media-tight around the periphery in housing body (4) via connecting devices (20) and engaging media-tight around the periphery in the line (2) with sealing devices (22);
    the connection devices (20) comprising an annular collar (26) of the housing body (4) extending radially inward and a mounting section (30) of the inner sleeve (8) tightly attached in an opening (28) of the annular collar (26); and
    the mounting section (30) of the inner sleeve (8) being tightly attached in bonded fashion in the opening (28) of the annular collar (26).

2. Plug connector for releasable connection of a pressurized line (2), comprising:
    a housing body (4) with a receiving opening (6) for insertion of one end (2a) of the line (2), and with an inner sleeve (8) attached in housing body (4) in an arrangement extending coaxially within the receiving opening (6) for engagement into the inserted line end (2a), in which a clamping element (12) is mounted to move axially in the receiving opening (6), so that the clamping element cooperates with an inner conical surface (14) of the housing body (4) to secure the line (2) and, in so doing, acts radially inward against the outer periphery of line (2) with at least one mounting edge (16) in shape-matched or frictional and shape-matched fashion;
    the inner sleeve (8) being rigidly attached media-tight around the periphery in housing body (4) via connecting devices (20) and engaging media-tight around the periphery in the line (2) with sealing devices (22);
    the connection devices (20) comprising an annular collar (26) of the housing body (4) extending radially inward and a mounting section (30) of the inner sleeve (8) tightly attached in an opening (28) of the annular collar (26);
    the mounting section (30) of the inner sleeve (8) being secured in shape-matched fashion in the opening (28) of the annular collar (26); and
    the inner sleeve (8) having contact devices on the side of the annular collar (26) facing the line-receiving opening (6) lying axially on the annular collar, in the form of a radial annular connector (32) or torus (34), and fixation devices on the opposite end of the mounting section (30), in the form of a radial sleeve expansion (36).

3. Plug connector for releasable connection of a pressurized line (2), comprising:
    a housing body (4) with a receiving opening (6) for insertion of one end (2a) of the line (2), and with an inner sleeve (8) attached in housing body (4) in an arrangement extending coaxially within the receiving opening (6) for engagement into the inserted line end (2a), in which a clamping element (12) is mounted to move axially in the receiving opening (6), so that the clamping element cooperates with an inner conical surface (14) of the housing body (4) to secure the line (2) and, in so doing, acts radially inward against the outer periphery of line (2) with at least one mounting edge (16) in shape-matched or frictional and shape-matched fashion;

the inner sleeve (8) being rigidly attached media-tight around the periphery in housing body (4) via connecting devices (20) and engaging media-tight around the periphery in the line (2) with sealing devices (22);

the connection devices (20) comprising an annular collar (26) of the housing body (4) extending radially inward and a mounting section (30) of the inner sleeve (8) tightly attached in an opening (28) of the annular collar (26); and the mounting section (30) of the inner sleeve (8) being secured in shape-matched fashion in the opening (28) of the annular collar (26); and the connection devices (20) being formed by a shape-matched snap connection.

4. Plug connector for releasable connection of a pressurized line (2), comprising:

a housing body (4) with a receiving opening (6) for insertion of one end (2a) of the line (2), and with an inner sleeve (8) attached in the housing body (4) in an arrangement extending coaxially within the receiving opening (6) for engagement into the inserted line end (2a), in which a clamping element (12) is mounted to move axially in the receiving opening (6), so that secure the line (2) and, in so doing, acts radially inward against the outer periphery of line (2) with at least one mounting edge (16) in shape-matched or frictional and shape-matched fashion;

the inner sleeve (8) being rigidly attached media-tight around the periphery in housing body (4) via connecting devices (20) and engaging media-tight around the periphery in line (2) with sealing devices (22);

the connection devices (20) consist of an annular collar (26) of the housing body (4) extending radially inward and a mounting section (30) of the inner sleeve (8) tightly attached in an opening (28) of the annular collar (26); and the mounting section (30) of the inner sleeve (8) being pressed into the opening (28) of the annular collar (26).

5. Plug connector for releasable connection of a pressurized line (2), comprising:

a housing body (4) with a receiving opening (6) for insertion of one end (2a) of the line (2), and with an inner sleeve (8) attached in housing body (4) in an arrangement extending coaxially within the receiving opening (6) for engagement into the inserted line end (2a), in which a clamping element (12) is mounted to move axially in the receiving opening (6), so that the clamping element cooperates with an inner conical surface (14) of the housing body (4) to secure the line (2) and, in so doing, acts radially inward against the outer periphery of line (2) with at least one mounting edge (16) in shape-matched or frictional and shape-matched fashion;

the inner sleeve (8) being rigidly attached media-tight around the periphery in housing body (4) via connecting devices (20) and engaging media-tight around the periphery in the line (2) with sealing devices (22);

the inner sleeve (8) is sealed via at least one elastic peripheral seal (38) against the housing body (4); and the peripheral seal (38) setting radially between a housing-annular collar (26) and the mounting section (30) of the inner sleeve (8).

6. Plug connector for releasable connection of a pressurized line (2), comprising:

a housing body (4) with a receiving opening (6) for insertion of one end (2a) of the line (2), and with an inner sleeve (8) attached in housing body (4) in an arrangement extending coaxially within the receiving opening (6) for engagement into the inserted line end (2a), in which a clamping element (12) is mounted to move axially in the receiving opening (6), so that the clamping element cooperates with an inner conical surface (14) of the housing body (4) to secure the line (2) and, in so doing, acts radially inward against the outer periphery of line (2) with at least one mounting edge (16) in shape-matched or frictional and shape-matched fashion;

the inner sleeve (8) being rigidly attached media-tight around the periphery in housing body (4) via connecting devices (20) and engaging media-tight around the periphery in the line (2) with sealing devices (22); and a counterconical surface (40) being arranged within the housing body (4) so that the clamping element (12) can be spread radially to release the line (2) by displacement against the counterconical surface (40).

7. Plug connector according to claim 6, characterized by the fact that the counterconical surface (40) is formed on an annular connector (32) designed in one piece with inner sleeve (8).

8. Plug connector according to claim 6, characterized by the fact that the counterconical surface 40 is formed on an axial annular projection (42) designed in one piece with the housing-annular collar (26).

9. Plug connector for releasable connection of a pressurized line (2), comprising:

a housing body (4) with a receiving opening (6) for insertion of one end (2a) of the line (2), and with an inner sleeve (8) attached in housing body (4) in an arrangement extending coaxially within the receiving opening (6) for engagement into the inserted line end (2a), in which a clamping element (12) is mounted to move axially in the receiving opening (6), so that the clamping element cooperates with an inner conical surface (14) of the housing body (4) to secure the line (2) and, in so doing, acts radially inward against the outer periphery of line (2) with at least one mounting edge (16) in shape-matched or frictional and shape-matched fashion;

the inner sleeve (8) being rigidly attached media-tight around the periphery in housing body (4) via connecting devices (20) and engaging media-tight around the periphery in the line (2) with sealing devices (22); and the housing body (4) comprises two joinable individual parts, an insertion part (4a) insertable into a hole (44) of an aggregate part (46) and a connection part (4b) connectable to the line (2), in which the insertion part (4a) is operative to be joined either to the connection part (4b) or directly to the line (2).

10. Plug connector according to claim 9, characterized by the fact that the insertion part (4a) and the connection part (4b) are connectable via a shape-matched snap connection (60).

11. Plug connector according to claim 9, characterized by the fact that the insertion part (4a) has a receiving opening (6a) that largely corresponds in its design to the receiving opening (6) of connection part (4*b*), in which the connection part (4*b*) has a connection section 62 that can be inserted into the receiving opening (6*a*) of insertion part (4*a*).

12. Plug connector according to claim 11, wherein an internal annular groove (64) is formed within receiving opening (6*a*) of the insertion part (4*a*), in which a connection section (62) of the connection part (4*b*) engages with an elastic snap element (66).

13. Plug connector according to claim 11, characterized by the fact that a radial seal (68) is arranged between the receiving opening (6*a*) of insertion part (4*a*) and the inserted connection section (62) of connection part (4*b*) and/or an axial seal (70) is arranged between the insertion part (4*a*) and connection part (4*b*).

* * * * *